(12) United States Patent
Fritz et al.

(10) Patent No.: US 11,108,701 B1
(45) Date of Patent: *Aug. 31, 2021

(54) SYSTEM AND METHOD FOR OBJECT-RESPONSE ASSET AUTHORIZATION AND PAIRING

(71) Applicant: Groupon, Inc., Chicago, IL (US)

(72) Inventors: Kyle Fritz, Baltimore, MD (US); Jamie Gaskins, Baltimore, MD (US); Edward Schmalzle, Baltimore, MD (US); William Pleasanton, Baltimore, MD (US); Michael Hartman, Baltimore, MD (US)

(73) Assignee: GROUPON, INC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/990,540

(22) Filed: Aug. 11, 2020

Related U.S. Application Data

(63) Continuation of application No. 15/280,208, filed on Sep. 29, 2016, now Pat. No. 10,778,598.

(60) Provisional application No. 62/235,560, filed on Sep. 30, 2015.

(51) Int. Cl.
*H04L 12/911* (2013.01)

(52) U.S. Cl.
CPC .................. *H04L 47/70* (2013.01)

(58) Field of Classification Search
None
See application file for complete search history.

(56) References Cited

U.S. PATENT DOCUMENTS

| 8,244,594 B2 | 8/2012 | Barron et al. |
| 2014/0358703 A1 | 12/2014 | Stuntebeck et al. |
| 2016/0350837 A1 | 12/2016 | Williams et al. |

*Primary Examiner* — Jeffrey R Swearingen
(74) *Attorney, Agent, or Firm* — Alston & Bird LLP

(57) ABSTRACT

An apparatus, method, and computer program product are provided to pair request data objects with network response assets and their related systems to allow for the efficient movement of network resources and other resources in high-volume network environments that feature distributed network response assets. In some example implementations, location information such as triangulated position information associated with one or more mobile devices, along with other system characteristics is used to identify optimized pairs of request objects and response assets, such that request parameters, such as position and time constraints, can be efficiently met.

20 Claims, 9 Drawing Sheets

SYSTEM AND METHOD FOR OBJECT-RESPONSE ASSET AUTHORIZATION AND PAIRING

CROSS REFERENCE TO RELATED APPLICATION

The present application is a continuation of and claims priority to U.S. patent application Ser. No. 15/280,208, filed on Sep. 29, 2016, which claims the benefit of U.S. Provisional Patent Application Ser. No. 62/235,560 which was filed on Sep. 30, 2015 and titled METHODS, APPARATUS, AND COMPUTER PROGRAM PRODUCTS FOR DELIVERY DISPATCHING, the entire content of which is incorporated by reference herein for all purposes.

TECHNICAL FIELD

An example embodiment relates generally to network resource technology, particularly in the context of authorizing and optimizing the pairing of distributed network response assets to requests received by the network.

BACKGROUND

The widespread adoption of mobile device technology and the rise of near-universal connectivity in some regions has sparked a significant increase in the traffic experienced by many network systems. As users have become accustomed to the ability to transmit and receive large volumes of data, they have come to expect to be able to request and access significant resources and use such network resources with a minimum of delay. Many legacy systems that rely on the ability of a centralized set of network response assets to address and satisfy requests received by the system experience difficulties in fulfilling such requests. These difficulties can be exacerbated when the requests are time-sensitive in nature or impose other requirements on the system, such as the acquisition of resources from other unrelated entities which may be incompatible with the limited ability of the system to process high volumes of requests.

One approach to handling and satisfying high volumes of incoming requests received by a system is the use of a distributed set of network response assets, each of which are able to satisfy one or more requests independently of other network response assets. Such a distributed architecture can exhibit many advantages, including the potential for the simultaneous or near-simultaneous processing of numerous requests, and the potential to readily scale a system by feasibly adding additional network response assets. However, the use of such an architecture raises additional technical challenges associated with the efficient pairing of request objects to network response assets, particularly in contexts where the network response assets exhibit non-uniform characteristics.

BRIEF SUMMARY

An apparatus, computer program product, and method are therefore provided in accordance with an example embodiment in order to efficiently authorize and pair request data objects with network response assets in a network environment. In this regard, the method, apparatus and computer program product of an example embodiment provide for selecting a network response asset to be assigned to a request data object based at least in part on a set of request parameters and one or more network response asset characteristics, wherein the request parameters and network response asset characteristics comprise locations and, in some instances, other aspects of the request data object and the network response asset.

In an example embodiment, an apparatus is provided that includes at least one processor and at least one memory that includes computer program code with the at least one memory and the computer program code configured to, with the at least one processor, cause the apparatus to at least receive a request data object; extract from the request data object a set of request parameters, wherein the set of request parameters comprises: a first location identification, wherein the first location identification is associated with a requested intermediate destination, a set of request instructions associated with the requested intermediate destination, and a second location identification, wherein the second location identification is associated with a requested target destination; identify a set of network response assets; for each network response asset, determine a set of network response asset characteristics, wherein the set of network response asset characteristics comprises a third location identification, wherein the third location identification comprises a triangulation location of a mobile device associated with the network response asset; select a network response asset based at least in part on the set of request parameters and at least one network response asset characteristic; and transmit to the network response asset a portion of the request data object.

In some example implementations of such an apparatus, selecting a network response asset comprises configuring the apparatus to at least determine an ordered list of network response assets and select the highest ordered network response asset. In some such example implementations, and in other example implementations, transmitting to the network response asset a portion of the request data comprises configuring the apparatus to at least: cause a communication channel to be opened between the apparatus and the mobile device associated with the network response asset; and cause an indication of the request data to be displayed on a user interface of the mobile device. In some example implementations, the request parameters further comprise a time constraint associated with the request data.

In some example implementations of such an apparatus, the triangulation location of the mobile device associated with the network response asset comprises an indication of a real-time or a near real-time geographic position of mobile device. In some such example implementations, and in other example implementations, the set of network response asset characteristics further comprises a response state of the network response asset. In some such example implementations, and in other example implementations, the set of network response asset characteristics further comprise an authorization status of the network response asset.

In another example embodiment, a computer program product is provided that includes at least one non-transitory computer-readable storage medium having computer-executable program code instruction stored therein, the computer-executable program code instructions comprising program code instructions configured to: receive a request data object; extract from the request data object a set of request parameters, wherein the set of request parameters comprises: a first location identification, wherein the first location identification is associated with a requested intermediate destination, a set of request instructions associated with the requested intermediate destination, and a second location identification, wherein the second location identification is associated with a requested target destination; identify a set of network response assets; for each network response asset, determine a set of network response asset characteristics, wherein the set of network response asset characteristics comprises a third location identification, wherein the third location identification comprises a triangulation location of a mobile device associated with the network response asset; select a network response asset based at least in part on the set of request parameters and at least one network response asset characteristic; and transmit to the network response asset a portion of the request data object.

In some example implementations of such a computer program product, selecting a network response asset comprises determining an ordered list of network response assets and select the highest ordered network response asset. In some such example implementations, and in other example implementations, transmitting to the network response asset a portion of the request data comprises: causing a communication channel to be opened between the apparatus and the mobile device associated with the network response asset; and causing an indication of the request data to be displayed on a user interface of the mobile device. In some example implementations, the request parameters further comprise a time constraint associated with the request data.

In some example implementations of such a computer program product, the triangulation location of the mobile device associated with the network response asset comprises an indication of a real-time or a near real-time geographic position of mobile device. In some such example implementations, and in other example implementations, the set of network response asset characteristics further comprises a response state of the network response asset. In some such example implementations and in other example implementations, the set of network response asset characteristics further comprise an authorization status of the network response asset.

In another example embodiment, a method for object-response asset authorization and pairing is provided, the method comprising: receiving a request data object; extracting from the request data object a set of request parameters, wherein the set of request parameters comprises: a first location identification, wherein the first location identification is associated with a requested intermediate destination, a set of request instructions associated with the requested intermediate destination, and a second location identification, wherein the second location identification is associated with a requested target destination; identifying a set of network response assets; for each network response asset, determining a set of network response asset characteristics, wherein the set of network response asset characteristics comprises a third location identification, wherein the third location identification comprises a triangulation location of a mobile device associated with the network response asset; selecting a network response asset based at least in part on the set of request parameters and at least one network response asset characteristic; and transmitting to the network response asset a portion of the request data object.

In some example implementations of such a method, selecting a network response asset comprises determining an ordered list of network response assets and select the highest ordered network response asset. In some such example implementations, and in other example implementations, transmitting to the network response asset a portion of the request data comprises: causing a communication channel to be opened between the apparatus and the mobile device associated with the network response asset; and causing an indication of the request data to be displayed on a user interface of the mobile device. In some example implementations, the request parameters further comprise a time constraint associated with the request data.

In some example implementations of such a method, the triangulation location of the mobile device associated with the network response asset comprises an indication of a real-time or a near real-time geographic position of mobile device. In some such example implementations, and in other example implementations, the set of network response asset characteristics further comprises a response state of the network response asset and an authorization status of the network response asset.

BRIEF DESCRIPTION OF THE DRAWINGS

Figure 1:
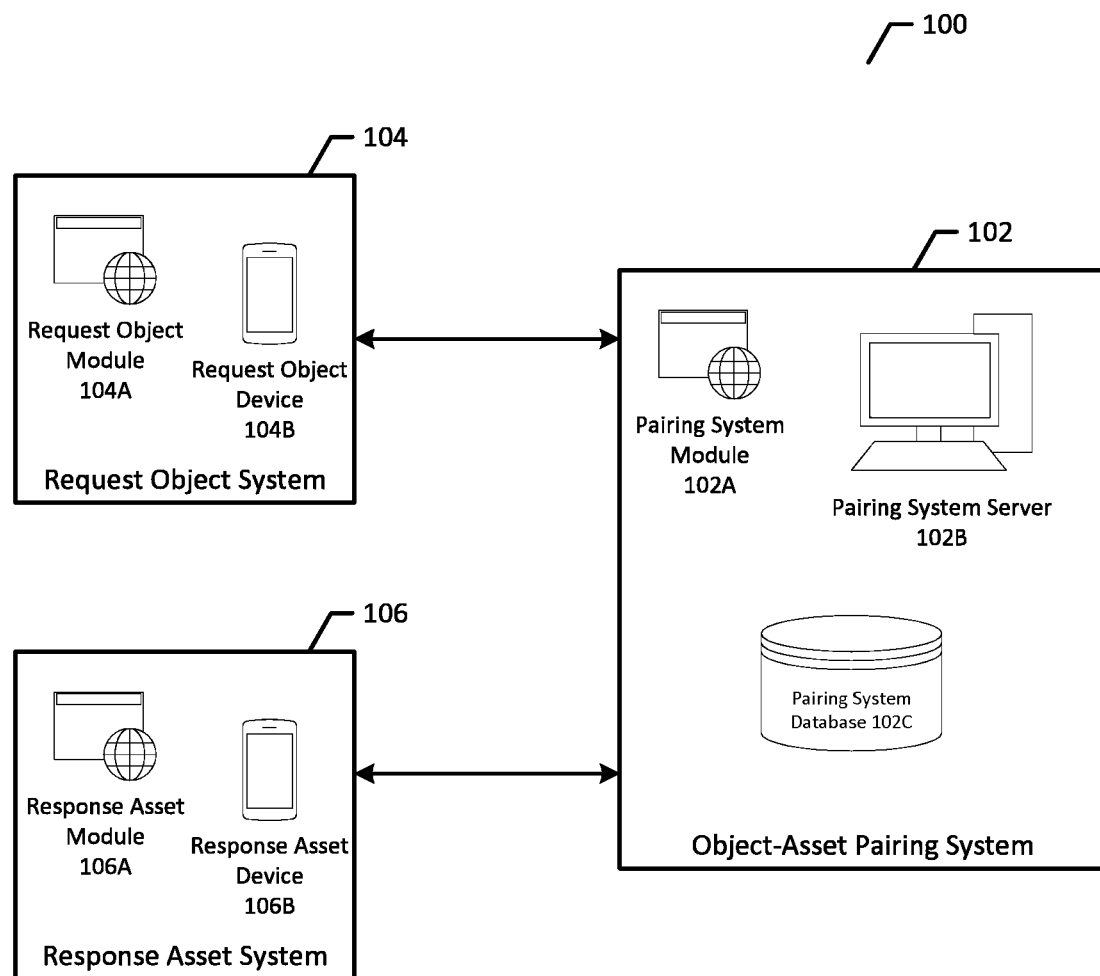
Figure 2:
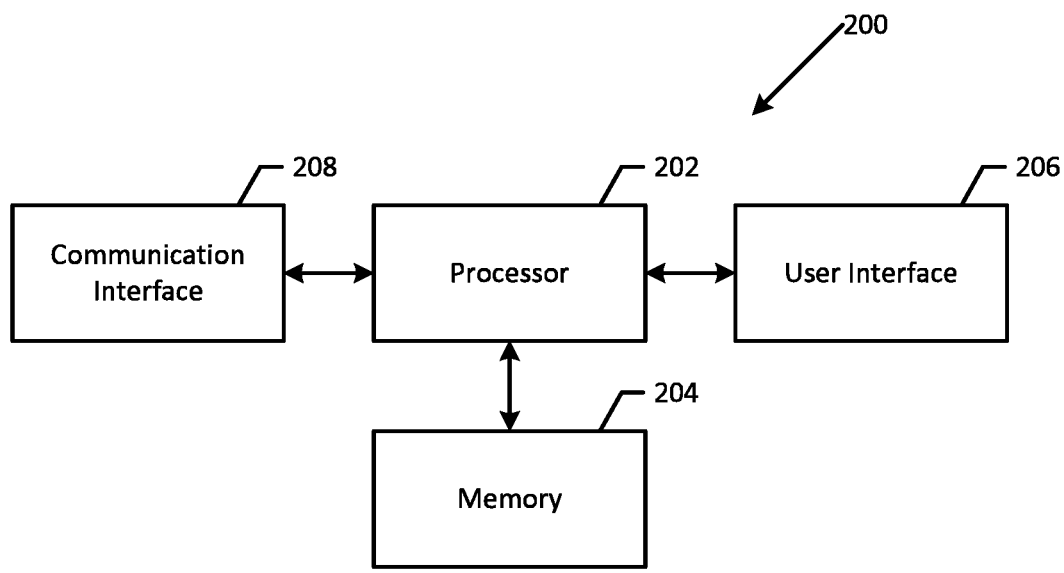
Figure 3:
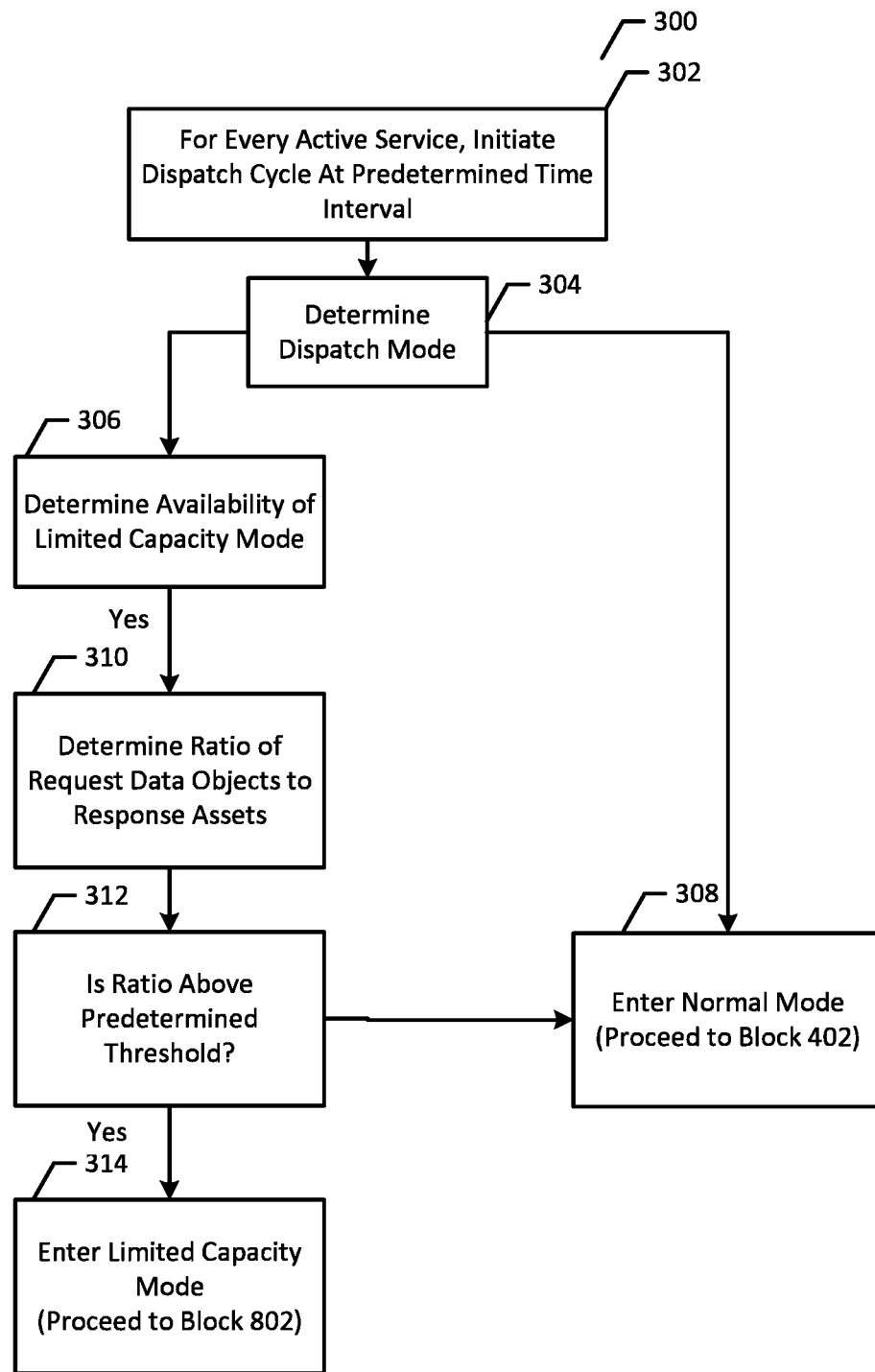
Figure 4:
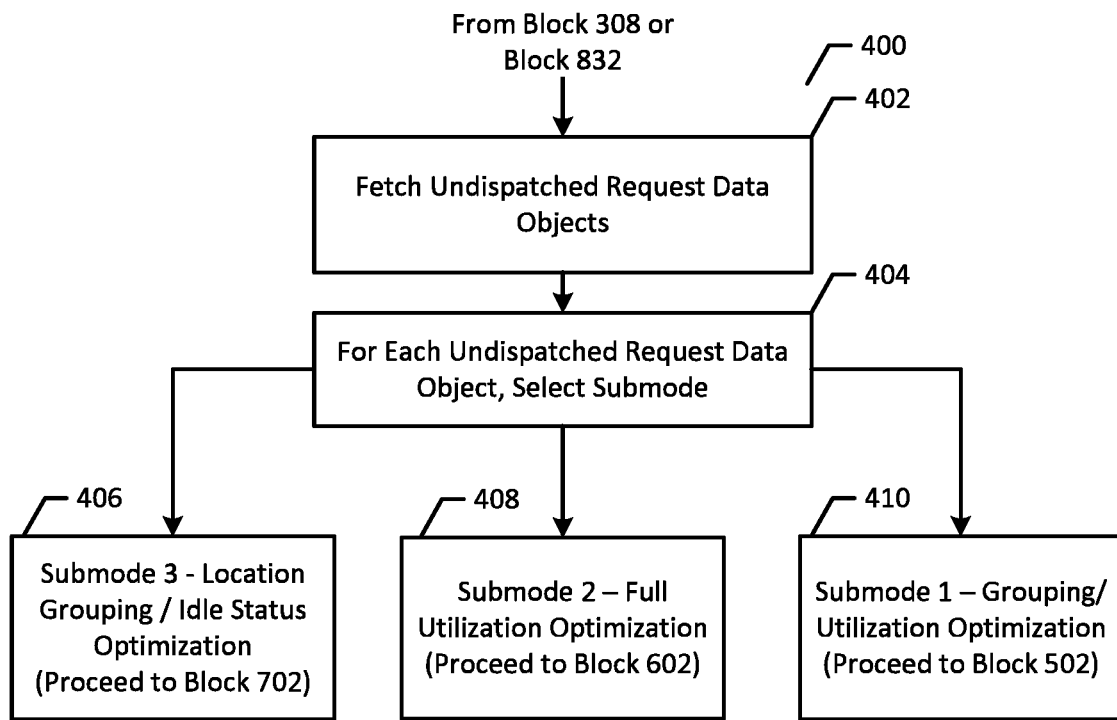
Figure 5:
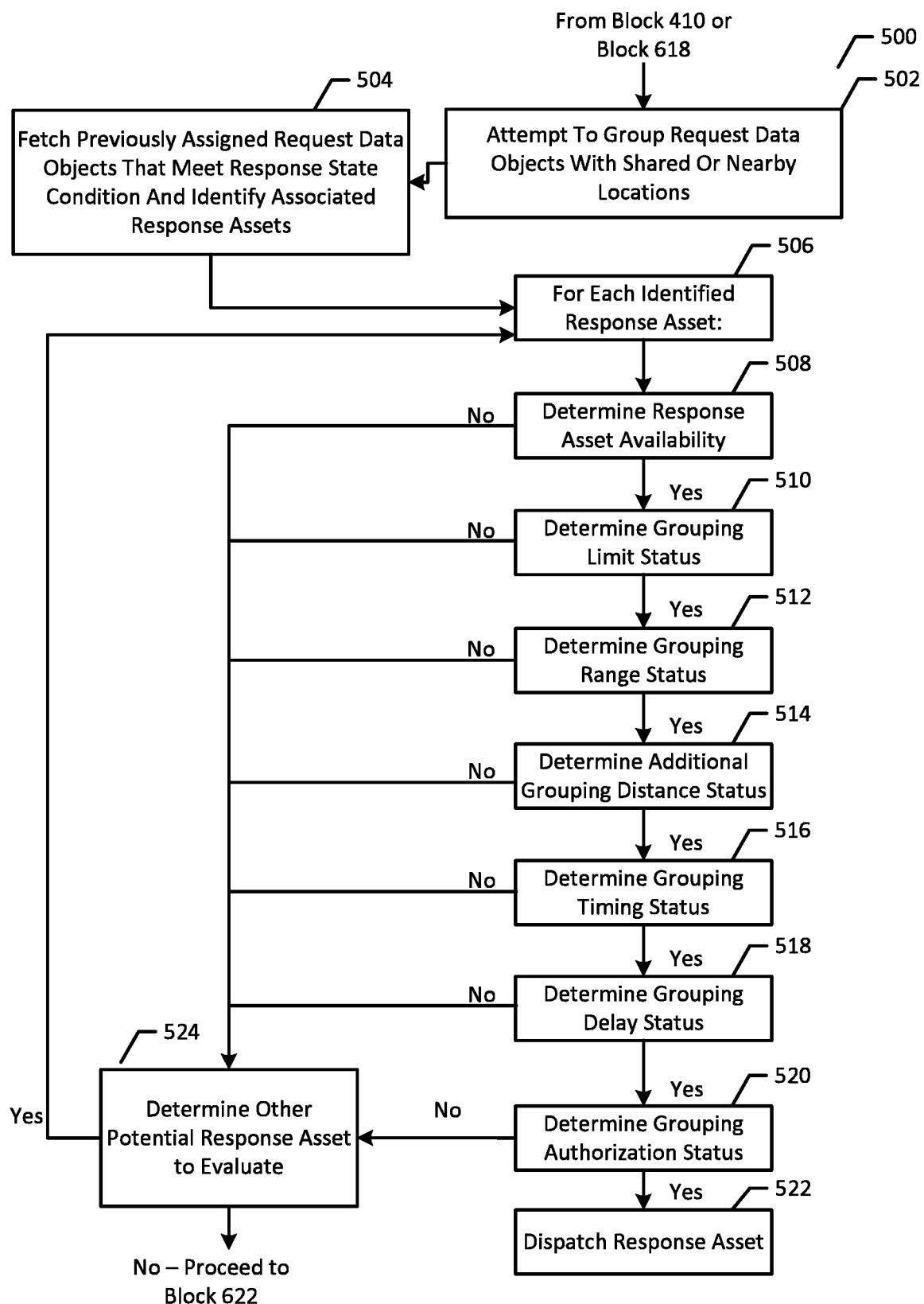
Figure 6:
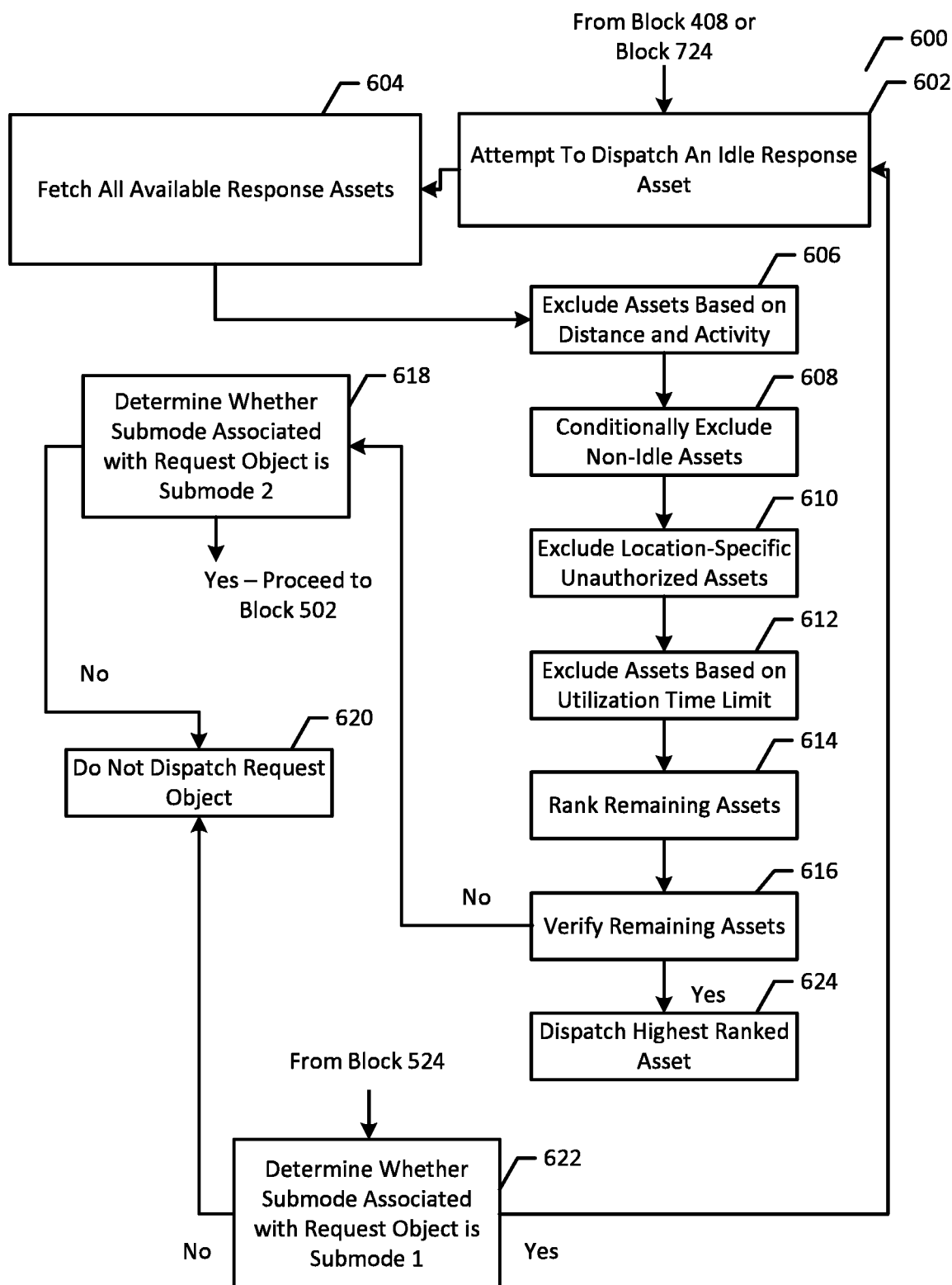
Figure 7:
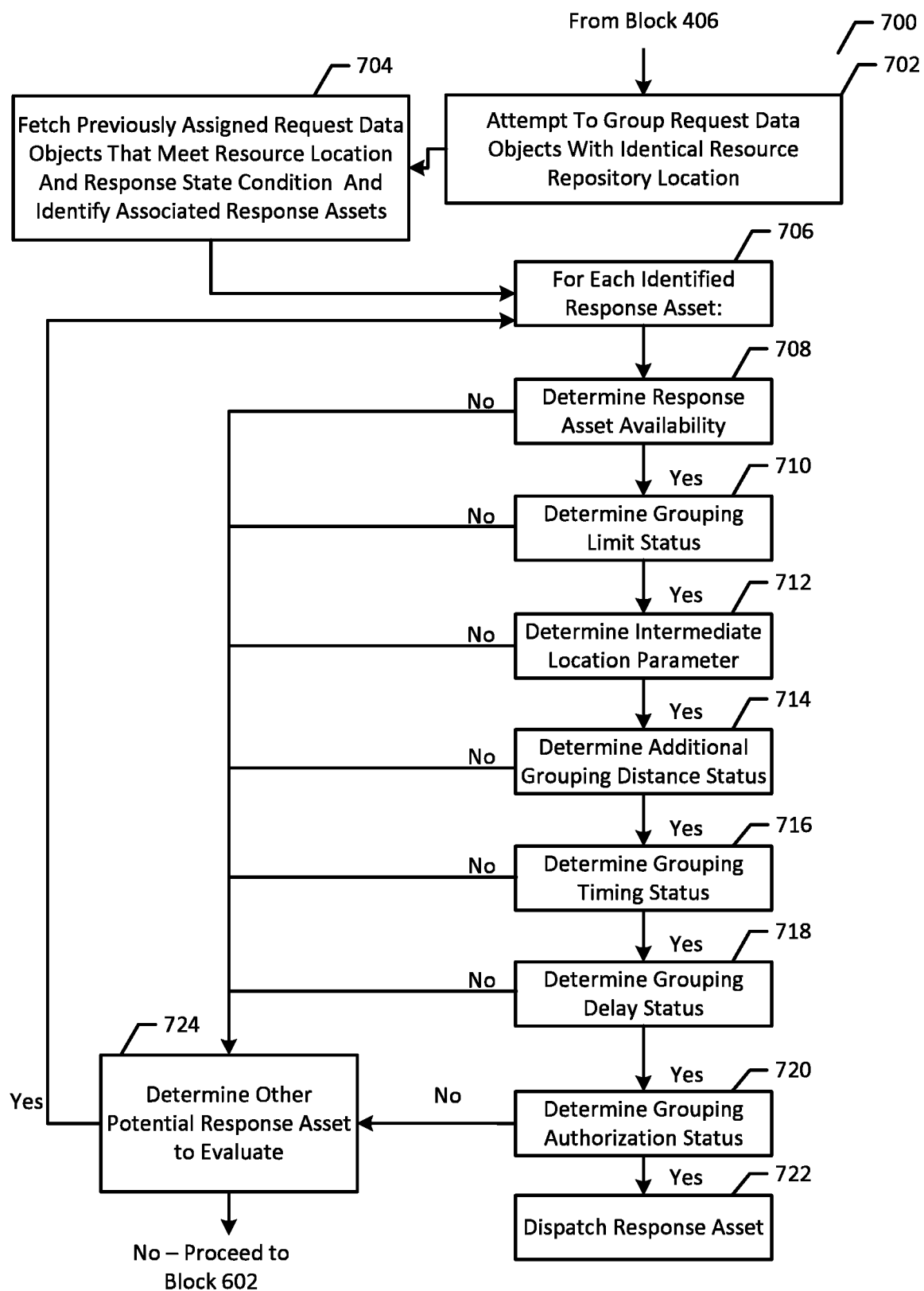
Figure 8:
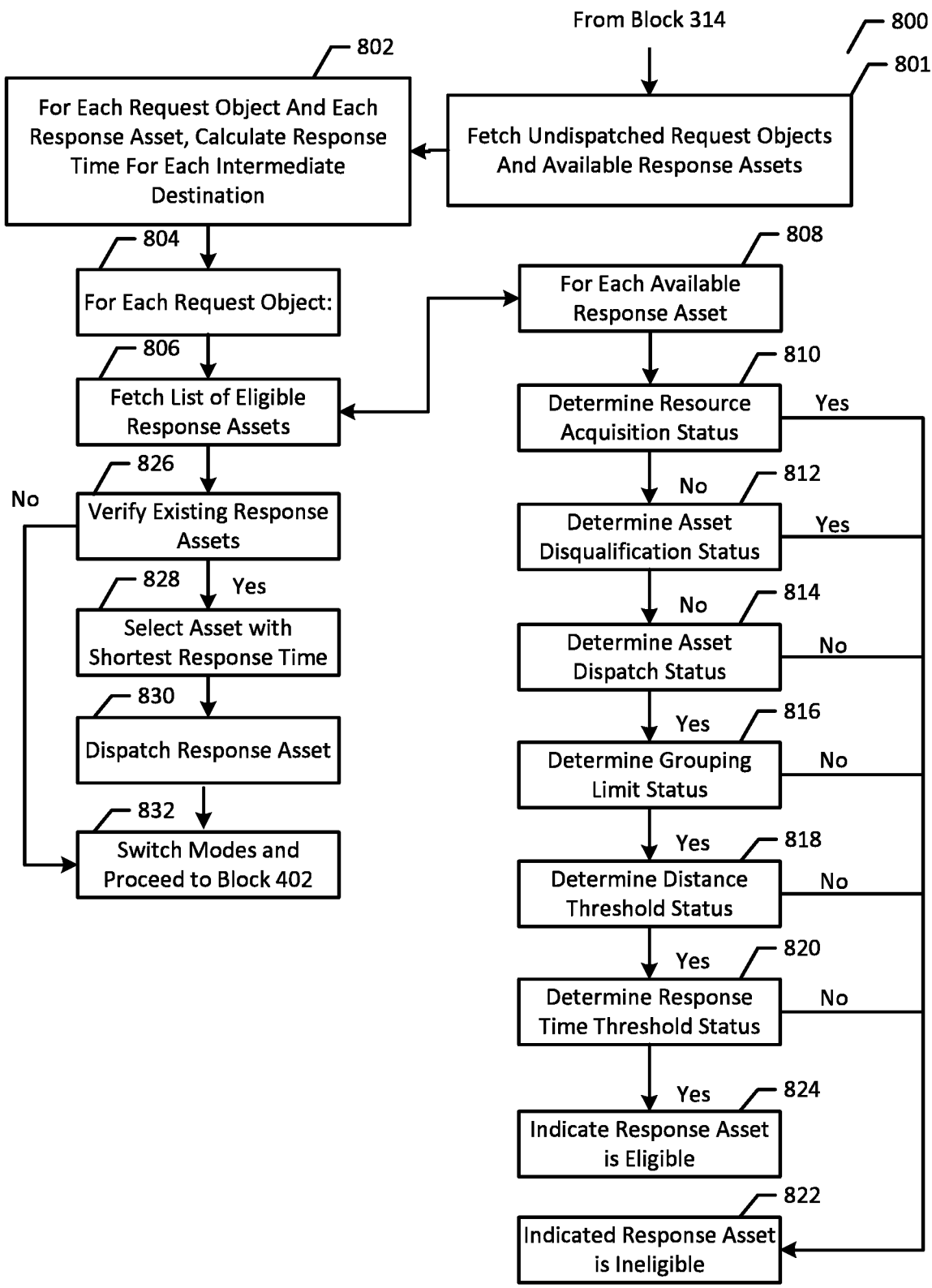
Figure 9:
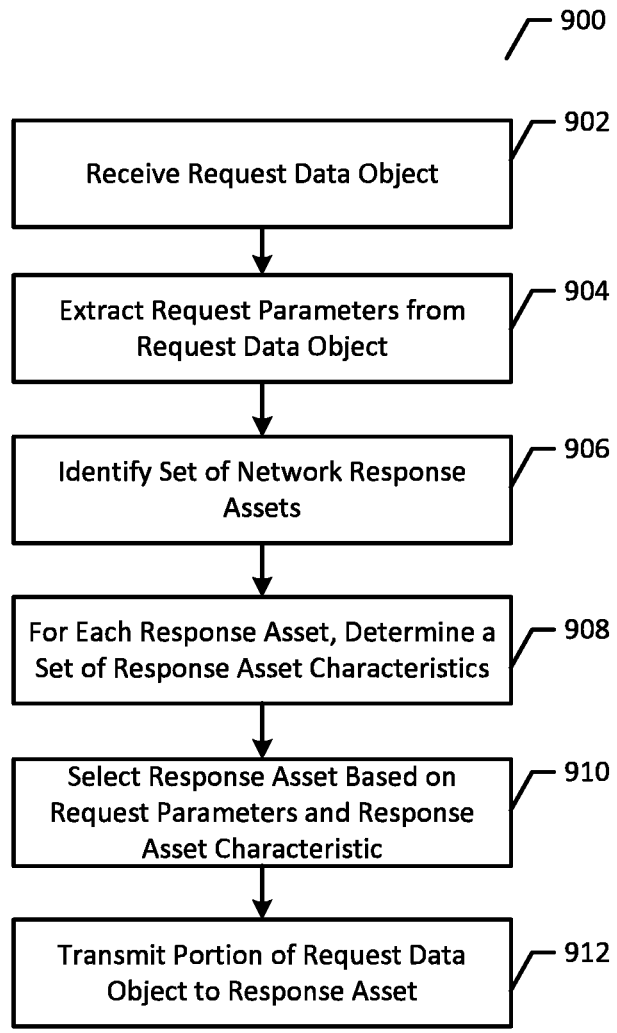

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a flowchart illustrating a portion of a set of operations performed, such as by the apparatus of FIG. 2, in accordance with an example embodiment of the present invention;

FIG. 4 is a flowchart illustrating an additional portion of a set of operations performed, such as by the apparatus of FIG. 2, in accordance with an example embodiment of the present invention;

FIG. 5 is a flowchart illustrating an additional portion of a set of operations performed, such as by the apparatus of FIG. 2, in accordance with an example embodiment of the present invention;

FIG. 6 is a flowchart illustrating an additional portion of a set of operations performed, such as by the apparatus of FIG. 2, in accordance with an example embodiment of the present invention;

FIG. 7 is a flowchart illustrating an additional portion of a set of operations performed, such as by the apparatus of FIG. 2, in accordance with an example embodiment of the present invention;

FIG. 8 is a flowchart illustrating an additional portion of a set of operations performed, such as by the apparatus of FIG. 2, in accordance with an example embodiment of the present invention; and FIG. 9 is a block diagram illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention.

Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, a "request data object" or "request object" is any data object that contains a request from a user or other entity for access to and/or use of system resources and an indication of the requirements and/or other parameters associated with the request.

As used herein, a "network response asset" is a finite network asset that may be paired with a request data object and is capable of providing network or other system resources in response to the request data object, and/or causing, through the interaction with other systems, the deployment of network and/or other system resources to fulfill the requirements and other parameters of a request data object.

Turning now to the Figures, FIG. 1 shows an example system environment 100 in which implementations involving the efficient pairing and authorization of request data objects and network response assets in accordance with an example embodiment of the present invention may be performed. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the pairing of request data objects and network response assets through, for example, the receipt of request data objects, the extraction of request parameters from each request data object, the identification of a set of network response assets, the determination of a set of network response asset characteristics, the selection of a network response asset based at least in part on the request parameters and network response asset characteristics, and the transmission of a portion of a request data object to the network response asset. Some such embodiments leverage a hardware and software arrangement or environment for request data object-to-network response asset pairing in accordance with the present invention.

As shown in FIG. 1, an object-asset pairing system 102 includes an online pairing system module 102A which is configured to receive, process, transform, transmit, communicate with, and evaluate request data objects, network response assets, and data and systems associated therewith via a web server, such as pairing system server 102B. The pairing system server 102B is connected to any of a number of public and/or private networks, including but not limited to the Internet, the public telephone network, and/or networks associated with particular communication systems or protocols, and may include at least one memory for storing at least application and communication programs. As shown in FIG. 1, object-asset pairing system 102 also includes a pairing database 102C that may be used to store information associated with request data objects, network response assets, and/or information related to the pairing thereof, which can be accessed by the pairing system module 102A and/or the pairing system server 102B. While FIG. 1 depicts pairing system database 102C as a single structure, it will be appreciated that pairing system database 102C may additionally or alternatively be implemented to allow the storage in a distributed fashion and/or at facilities that are physically remote from the each other and/or the other components of object-asset pairing system 102.

Request data objects and/or additional information to be associated with one or more request data objects may originate from a client system such as request object system 104. A user of request object system 104 may use a request object device 104B, such as a laptop computer, desktop computer, or mobile device, for example, to interface with a request object module 104A to generate a request data object and/or information to be included in a request data object, such as instruction associated with the request data object, intermediate and/or target destinations associated with the request object, and/or other information to be convey from a user as part of a request for a response to be conveyed to an object-asset pairing system, such as object-asset pairing system 102. In some example implementations, such as those that arise in contexts and situations where users seek to have goods, materials, and/or other resources delivered from one location to another, a request object system such as request object system 104 may take the form of, or be incorporated into, a user's mobile device which is configured to accept request information, such as an order for food from a restaurant, and transmit that information in the form of a request data object to an object-asset pairing system.

While only one request object system 104 is depicted in FIG. 1 in the interest of clarity, it will be appreciated that numerous other such systems may be present in system environment 100, permitting numerous users to develop and transmit request data objects to the object-asset pairing system 102

As shown in FIG. 1, system environment 100 also includes response asset system 106, which comprises a response asset module 106A and a response device 106B.

While only one response asset system 106 is depicted in FIG. 1 in the interest of clarity, it will be appreciated that numerous other such systems may be present in system environment 100, permitting numerous, distributed network response assets to be paired with request data objects and fulfill the requests contained therein. Response asset device may comprise and/or incorporate a laptop computer, desktop computer, mobile device, or the like, for example, and is configured to interface with a response asset module 106A to interact with object-asset pairing system 102 to fulfill the request(s) associated with one or more request data objects that have been paired with the network response asset. The response asset system 106 is also capable of communicating with object-asset pairing system 102 to provide information that the object-asset pairing system 102 may need when determining whether to pair a particular network response asset with a particular request data object. For example, response asset system 106 may, such as via the capabilities of response asset device 106B ascertain the location of response asset system 106 through the use of a global positioning system (GPS) interface, cellular location protocols, and/or other location protocols that involve triangulating and/or otherwise determining a position of response asset device 106B and/or other components associated with response asset system 106. In some example implementations, such as those that arise in contexts or situations involving the delivery of goods, materials, and/or other resources, for example, the response asset system may include and/or be incorporated into a vehicle.

Overall, and as depicted in system environment 100, object-asset pairing system 102 engages in machine-to-machine communication with request object system 104 and response asset system 106, via a network, to facilitate timely processing and pairing of request data objects such that request data objects received from request object system 104 are paired to a network response asset, and a system associated with that network response asset, such as response asset system 106, can be activated to fulfill the parameters of the requests contained in one or more received request data objects.

Based upon the parameters associated with a request data object and the characteristics of the available network response assets (and the systems related to such network response assets), a request data object may be paired with an authorized network response asset to facilitate the fulfillment of the request contained in the request data object. In this regard, a request data object may be paired with a network response asset by an apparatus 200 as depicted in FIG. 2. The apparatus may be embodied by the object-asset pairing system 102, or any of the components shown or otherwise contemplated therein, or any of the other devices discussed with respect to FIG. 1, and/or devices that may be incorporated or otherwise associated with environment 100. Alternatively, the apparatus 200 may be embodied by another computing device, external to such devices. For example, the apparatus may be embodied by a personal computer, a computer workstation, a server or the like, or by any of various mobile computing devices, such as a mobile terminal, e.g., a smartphone, a tablet computer, etc.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Some example implementations of the embodiments described herein are particularly advantageous in contexts and situations that involve the deployment of network resources to satisfy requests that require the acquisition and physical movement of goods, materials, and/or other resources, such as the delivery to a customer of food from a restaurant. As such, some example implementations are directed to providing for delivery dispatching (i.e., the deployment of response asset systems associated with network response assets, wherein such response asset systems are capable of transporting materials from one place to another, such as when a response asset system is incorporated into vehicle, for example) which minimizes delivery time while accounting for driver fairness and/or a relatively even distribution and deployment of system resources (such as the equitable distribution of request data object in the form of delivery requests amongst vehicle-based response asset systems). In such example implementations, the system (i.e., the object-asset pairing system and/or related components) attempts to optimize the number of orders or other requests dispatched to each response asset system (and/or driver or other operator related thereto) while trying to ensure that all deliveries are made properly and in a minimum delivery time.

In some such example implementations, in making a dispatching decision, the system (i.e., the object-asset pairing system or related components), which may be referred to in such contexts as a "dispatcher" attempts to determine which vehicle-based response asset system and/or driver to dispatch and when to dispatch them. With regard to when to dispatch a driver for an order, the order should be picked up timely for delivery, as the restaurant and the end customer want the order delivered quickly. However, a driver should not arrive too early to pick up an order, thus causing the driver to wait for the order to be ready to take for delivery.

Thus, in determining when to dispatch an order, lead time may be built in to the order for a predicted "make-time". For example, some orders may be prepared quickly (e.g. immediately) while other orders may take 20 to 30 minutes to prepare. Consequently, when an order is placed, based on the make time, the system may be able to discern or estimate how many orders will be ready to dispatch in the next 15 to 20 minutes, or within another relevant time window. However, make times may be dynamic and/or otherwise inconsistent based on a number of variables, such as delays introduced during during peak periods or additional time required for larger orders. Thus, some implementations of the present invention provide for adjustments based on make time to minimize the amount of time a driver waits for the order to be completed in the restaurant, yet still minimize the delivery time to the end customer. In some embodiments, predicted make times may be increased or decreased based on current circumstances. In some embodiments, make time predications may be based on historical order notifications and driver notifications.

Example implementations contemplate the use of a plurality of modes and approaches to making dispatching decisions. For example, one approach may involve causing the system to cycle through order deliveries that are deliverable (e.g., orders ready to be dispatched so that a driver arrives at the restaurant approximately when the order is ready) from oldest to newest and attempting to match the delivery with an available driver, based on distance and/or other driver criteria. Some implementations may use other criteria in making dispatching decisions, for example, determining whether a driver already has an order and/or how many orders a driver has already delivered. Using such criteria may assist in providing driver "fairness", that is, ensuring that each driver gets dispatched an equitable number of deliveries.

In some implementations, distance calculations may be determined based on linear distance between points or may be determined based on a drive time between locations. However, constantly trying to determine drive times for every driver to every restaurant may be overwhelming and/or otherwise exceed the computing capabilities of one or more systems, particularly in larger and/or more complex network environments. Consequently, some implementations use a "beacon" system that may be used in determining the times necessary to proceed from one location to another. In some implementations, of such a beacon system, a grid may be overlaid on a map of a relevant geographic area, and each grid point may be a beacon. Based on the geographical features, some of the grid point beacons may then be removed, such as beacons positioned in a body of water, for example. Travel times from the precalculated "beacon" locations to each potential location (such as a restaurant location and/or other location associated with the system and/or request data objects received by the system) may be determined and stored in a database, and updated on a regular basis. The travel time for a driver may then be determined by finding the closest beacon to the driver and using that beacon's precalculated drive time to estimate the drive time for the driver.

Said differently, to reduce required bandwidth and to increase efficiency (e.g., by requiring fewer location and distance calculation), travel time calculations can be efficiently estimated by calculating the distance between the beacon or virtual beacon and an intermediate destination and/or target destination. Thus, by maintaining travel times with respect to beacons, travel times for drivers can be estimated based on a determination as to which beacon is closest to the particular driver. The closest beacon is then usable as a proxy by which an estimated travel time for the driver can be calculated.

FIGS. 3-8 present an example process flow 300 and several portions thereof that may be performed by the apparatus 200 of FIG. 2 and/or by the apparatus 200 in conjunction with additional components, including but not limited to those discussed or otherwise contemplated in connection with FIG. 1. In this regard, the apparatus 200 and any related system is configured to perform the functions described herein, and includes components, such as the processor 202, the memory 204, the user interface 206, the communication interface 208 or the like, for doing so. As discussed throughout this disclosure, embodiments of the invention are generally directed to the optimal pairing of request objects with network response assets that are capable of (and authorized to) meet the requirements and/or other parameters of the request object. Many example implementations of such embodiments involve receiving a request data object, extracting a set of request parameters from the request data object; identifying a set of network response assets; determining a set of response asset characteristics for each response asset, selecting a response asset based on the request parameters and the response asset characteristics, and transmitting a portion of the request data object to the response asset. As discussed herein, some example implementations of embodiments of the invention are particularly advantageous in contexts where request data objects are associated with time-sensitive requests, the fulfillment of which require the physical interaction with systems or other entities at particular geographic locations. Some such contexts include, but are not limited to, systems that support the ordering and delivery of food or other goods and services by automatically optimizing the pairing of requests with response asset systems that are associated with delivery drivers or other similar entities.

FIG. 3 depicts a portion of a process flow 300. Some example implementations of process flow 300 contemplate, and can take into account, situations where the profile of an optimized pairing of request objects to response assets may shift over a relatively short time basis, and may be adjusted based on the particular priorities that are deemed optimal in a given instance and/or the quantity and characteristics of the particular request objects and response assets available at any given time. One such example implementation is depicted in FIG. 3, which contemplates two primary modes: a "normal mode" which is preferred and particularly advantageous in most instances, and a "limited capacity mode", which may be advantageous in situations where the relative demands and responsive resources available at a given time result in the system being at or near capacity or otherwise busy.

As shown in FIG. 3, one portion of process 300 involves determining and selecting the primary mode in which the system will operate when pairing requests and authorized response assets. Process 300 commences at block 302, which indicates that a dispatch cycle (namely, the pairing of unpaired requests received during a particular time window to potential network response assets) is initiated for every active service at a predetermined time interval. Some example implementations of process 300 in general, and block 302 in particular, contemplate a system that is capable of managing request object-to-response asset pairing in numerous geographically distinct regions, referred to herein as "services", which may be active at any given time. It will be appreciated that the predetermined time interval may be any time interval, and may be based on the volume of request objects received and the timing parameters associated with the request objects. In many example implementations, the time interval is on the order of seconds, such that incoming request objects are rapidly paired with their respective network response asset.

As shown in FIG. 3, process 300 continues to block 304. At block 304, the system commences determining which dispatch mode it should operate in when pairing request objects with response assets. As such, implementations of block 304 and the related elements in FIG. 3 and elsewhere contemplate that one of the initial tasks necessary to determining an optimized pairing of request objects to response assets may include ascertaining the framework and criteria against which pairings will be evaluated.

At block 306, the system determines whether an alternate mode, such as a limited capacity or "busy" mode, is available for a particular service. In some example implementations, such a limited capacity mode is unavailable, unnecessary, and/or otherwise unimplemented in a given region. In such regions, it may be determined at block 306 that such a mode is not available, and the process 300 proceeds to block 308, wherein the system enters and/or is otherwise set to a normal operations mode.

In locations and situations where an alternate mode is available, the process 300 is depicted as proceeding to block 310, wherein the ratio of request data objects to response assets is determined. In some example implementations of block 310, this ratio is determined by ascertaining the number of unpaired (e.g., undispatched) request objects, ascertaining the number of available network response assets, and dividing the number of unpaired request objects by the number of available response assets.

As shown in FIG. 3, the process 300 then proceeds to block 312, wherein the ratio computed in block 310 is compared to a predetermined threshold. In some example implementations, the predetermined threshold is selected to reflect conditions wherein the system may be considered to be at or near capacity, namely, the conditions under which the ability of the available response assets to properly fulfill further requests becomes limited or otherwise compromised. In instances where the ratio calculated in block 310 is determined at block 312 to meet or exceed the predetermined threshold, process 300 proceeds to block 314, where the system enters a limited capacity mode, which is described in more detail in connection with the process portion 800 shown in FIG. 8. In instances where the ratio calculated in block 310 is determined at block 312 to be less than the predetermined threshold, process 300 proceeds to block 308, where the system enters a normal mode, which is discussed in more detail in connection with the process portions shown in FIGS. 4-7.

FIG. 4 depicts an example process portion 400, which is a portion of the process 300 presented in FIG. 3. As shown in FIG. 4, process portion 400 may be incorporated into process 300 via block 308 (and, in some implementations, block 832, which is discussed in connection with FIG. 8), and may be particularly advantageous in example implementations where the system is configured to operate in a "normal" mode of operations. Overall, process portion 400 is directed at selecting a submode that reflects the particular criteria and/or operating principles that will be used to ascertain whether a request object-to-response asset pairing is acceptable and/or optimal.

As shown in FIG. 4, process portion 400 includes block 402, wherein unpaired or otherwise undispatched request data objects are fetched for pairing and other processing. As shown in block 404, a submode is selected for each such unpaired request data object. In FIG. 4, three submodes are depicted. Submode 1, depicted at block 410, generally involves criteria and processes aimed at automatically and efficiently grouping request data objects with a single response asset, such that the system prioritizes grouping undispatched requests together with other undispatched requests (and/or other previously paired/dispatched requests) over ensuring that a greater portion of the available response assets are assigned to a request object at any given time. Submode 1, and/or similarly constructed submodes, may be particularly advantageous in contexts where a system associated with a response asset must physically move between multiple locations to fulfill a request. In the case of a food delivery, the use of Submode 1 may lead to an increase in instances where a single delivery driver is tasked with the collection and delivery of a number of orders from restaurants that are located near each other and are scheduled to be ready for delivery at similar times. In instances where Submode 1 is selected, process portion 400 proceeds to block 502 of process portion 500, as discussed in connection with FIG. 5.

Submode 2, shown at block 408 in FIG. 4, generally involves criteria and processes aimed at ensuring request objects and response assets are paired in a manner that reduces the time that any particular response asset is idle. Implementations of Submode 2 may be particularly advantageous in situations where there is an ample supply of response assets and the timing constraints associated with a significant number of request objects are such that any actual and/or perceived delay associated with grouping of multiple request objects may be deemed unacceptable. In instances where Submode 2 is selected, process portion 400 proceeds to block 602 and process portion 600, as discussed in connection with FIG. 6.

Submode 3, shown at block 406, generally involves criteria and processes aimed at ensuring request objects and response assets are paired in a manner that prioritizes grouping in instances where multiple request objects involve the same location, but otherwise seeks to reduce the time that any particular response asset is idle. In example implementations involving deliveries of goods and services, multiple request objects may require a response asset to acquire goods from a particular location, such as a particular restaurant. In Submode 3, the system will attempt (in accordance with other criteria discussed and otherwise contemplated in connection with process portion 700 in FIG. 7) to group orders associated with a single restaurant with one response asset, and otherwise seek to assign idle response assets to unpaired request objects. In instances where Submode 3 is selected, process portion 400 proceeds to block 702 and process 700, as discussed in connection with FIG. 7.

It will be appreciated that while three Submodes are depicted and described in connection with FIG. 4 and process portion 400, these Submodes are merely examples of submodes and/or other indicia of pairing and optimization goals and parameters that may be advantageous in particular implementations of embodiments of the invention. As such, implementations that involve more and/or fewer submodes, including but not limited to implementations that do not contemplate the selection from amongst submodes, may also be performed without departing from the spirit and scope of embodiments of the invention.

FIG. 5 depicts a process portion 500 associated with Submode 1 discussed in connection with block 410 of FIG. 4. As shown in FIG. 5, process portion 500 commences at block 502 when process 300 transitions from block 410 (or block 618, as discussed herein with respect to FIG. 6). As discussed in connection with Submode 1 and block 410, block 502 indicates that process portion 500 is configured to attempt to group request objects that involve locations that are identical or nearby each other. In the context of dispatching drivers to physically pick up and deliver goods and services, such as food orders, implementations of process portion 500 seek to assign multiple orders to a single driver such that the driver is able to stop at a number of restaurants that are near each other, pick up the various requested items within a particular time window, and then proceed to the respective delivery locations and effectuate on-time deliveries.

As depicted by block 504, process portion 500 includes fetching all previously assigned request data objects that meet a particular response state condition, and identifying the response asset associated with each such object. In implementations of block 504 that arise in system environments similar to system environment 100, the object-asset pairing system 100 may fetch the relevant request data objects by having pairing system module 102A and/or pairing system server 102B query the pairing system database 102C or another data repository and processing the returned query results to identify the desired data. In implementations involving physical deliveries, upon receiving an unpaired/undispatched request, block 504 involves fetching all other deliveries which have been dispatched and/or otherwise assigned to a particular driver, but for which the driver has not yet picked up the order. As such, block 504 contemplates detecting a delivery state in which a driver may be en route to a restaurant or other location, but, because the driver has not yet picked up the food or other goods, the driver may be able to be efficiently rerouted to pick up another delivery and maintain the ability to successfully perform all of the necessary steps associated with each of the multiple deliveries.

Once the potentially relevant request data objects are acquired and the potential response assets identified, process portion 500 proceeds to block 506, which is the starting point of a set of qualification criteria against which all of the identified response assets are compared. It will be appreciated that while FIG. 5 and process portion 500 depict a series of criteria (shown at blocks 508-520), alterations to the criteria may be made (including but not limited to the addition, subtraction and/or modification of the criteria) without departing from the spirit and scope of embodiments of the invention. Moreover, and regardless of the precise criteria applied and/or the mechanism used to establish the criteria, example implementations of blocks 508-520 may accomplish the evaluation of each response asset through the interaction of system components, such as the apparatus 200, and/or other components, such as object-asset pairing system 102, and/or querying a database that houses the relevant information, such as pairing system database 102C. In other example implementations, information used to evaluate a particular response asset may be obtained by seeking and/or receiving an indication associated with the response asset's characteristics by establishing communication with a user device and/or application module associated with the response asset, such as, for example, the response asset module 106A and the response asset device 106B which are shown in FIG. 1 as part of a response asset system 106.

As shown at block 508, one of the qualification criteria in process portion 500 involves determining the response asset's availability. Some implementations of block 508 contemplate determining whether a given response asset is available to be paired with and satisfy the requirements associated with a request object. For example, implementations of block 508 may include ascertaining whether a particular response asset is in use, online or offline, and whether systems associated with the network response asset are inside or outside of a particular geographic region, or otherwise presenting indicia of availability, and/or otherwise ascertaining the availability status of the response asset. If the particular response asset is deemed unavailable, process portion 500 proceeds from block 508 to block 524, where it is determined if there are any additional response assets to evaluate for potential assignment.

In instances where a particular response asset is determined to be available in block 508, process portion 500 proceeds to block 510, where it is determined whether the particular response asset is under a grouping limit. Implementations of block 510 recognize that, depending on the specific characteristics of the technical environment associated with any particular implementation, there is a limit on the number of request objects that can be grouped with a response asset while still maintaining the successful and accurate satisfaction of the requests contained in the grouped request data objects. Particularly in the case of non-uniform, distributed systems, the grouping capacity of any particular response asset may vary from response asset to response asset. In example situations that arise in the context of response assets that are associated with systems that are tasked with traveling to particular geographic locations to acquire materials and/or other goods for delivery to another geographic location, the ability of a particular response asset system to properly acquire, track, and transport goods associated with multiple orders may be a function of the capacity of the vehicle associated with the response asset, the ability demonstrated by agents and/or other users associated with the response asset system, and/or other factors that bear on the response asset's ability to successfully satisfy the requirements associated with multiple concurrent request data objects. If the particular response asset is determined to be at or over the grouping limit set for the particular response asset, process portion 500 proceeds from block 510 to block 524, where it is determined if there are any other response assets to evaluate for potential assignment.

In situations where a particular response asset is determined to be under the grouping limit for that response asset, process portion 500 proceeds to block 512, which includes determining a grouping range status associated with the particular response asset under evaluation. In addition to determining a limit on a particular response asset's ability to accommodate groupings over a certain size, as performed in block 510, process portion 500 in general and block 512 particular contemplate the existence of a limit on the distance that a system associated with a particular response asset may be able to travel in connection with any particular grouping of request objects while maintaining the ability to satisfy the requirements of each request data object within the group. Some example implementations, such as those that arise in the context of requests that require traveling to multiple geographic locations to obtain and deliver goods and/or other materials needed to satisfy a request, contemplate at least two destinations associated a particular request object. The first, an intermediate destination, is often the location at which goods, materials, and/or other resources necessary to fulfill the requirements of the request object are acquired. The second location, a target destination, is often the location at which the goods, materials, and/or other resources are to be delivered. Such example implementations recognize that, in most instances, there is a practical limit on the distance that a system associated with a response asset can effectively travel between intermediate locations while optimally and/or efficiently satisfying the grouped requests. For example, if a delivery driver is tasked with a group of orders that require him to pick up food items from a group of restaurants that are in relatively close proximity to each other, adding an order that requires the driver to drive across town to pick up another order would likely impair the ability of the driver to successfully complete the other deliveries. However, if the potential additional order involved picking up an order from the same restaurant as one already in the driver's group, or a restaurant located reasonably nearby, it may be advantageous to task the driver with picking up the additional order in the course of satisfying the other grouped orders. Implementations of block 512 contemplate that the precise distance established as a response asset's grouping range may vary based on the characteristics of the particular system associated with the response asset, the geographic area or region in which the response asset operates, the time of day, traffic and/or infrastructure conditions, and other factors. If the particular response asset is determined to be in a condition such that the assigning the unassigned request data object to the response asset would put the group associated with the response asset at or over the grouping range limit set for the particular response asset, process portion 500 proceeds from block 512 to block 524, where it is determined if there are any other response assets to evaluate for potential assignment.

In situations where it is determined that adding the currently unassigned request data object to the response asset under evaluation would allow the response asset to stay within the grouping range limit set for that response asset, process portion 500 proceeds to block 514, which includes determining an additional grouping distance status associated with the response asset and the unassigned request object. While implementations of block 512 are primarily focused on the proximity of intermediate destinations (such as locations at which goods and/or other materials associated with fulfilling the request objects grouped with that response asset must be acquired), implementations of block 514 are primarily focused on the target destinations associated with the request objects, namely, the locations designated as delivery points for the request data objects. For example, in the context of a delivery service, it is generally efficient to group orders where the intermediate locations associated with resource acquisition are within a certain range of each other, and where the requested target destinations are within a certain range of each other, such that the system associated with the response asset is not required to travel far distances for each step in satisfying a request object. As such, implementations of block 514 involve determining whether the addition of a particular request object would require a system associated with a response asset to travel a distance that exceeds a predetermined limit. If the particular response asset is determined to be in a condition such that the assigning the unassigned request data object to the response asset would put the group of request data objects associated with the response asset at or over the additional grouping distance limit set for the particular response asset, process portion 500 proceeds from block 514 to block 524, where it is determined if there are any other response assets to evaluate for potential assignment.

In situations where the response asset is able to accommodate the additional request object without exceeding the additional grouping distance limit, process portion 500 proceeds to block 516, which includes determining a grouping timing status. Implementations of block 516 recognize that grouping request data objects such that a single response asset is responsible for ensuring that all of the steps associated with satisfying each request data object may be particularly advantageous when certain timing parameters associated with the request data objects are aligned. For example, in implementations that arise in the context of acquiring goods and/or other materials and delivering them to a target destination associated with a request object, grouping a number of request objects with a particular response asset may be optimal or otherwise efficient when the goods and/or other materials are likely to be available for pickup at or near the same time. For example, in the context of grouped food deliveries, it is generally preferable for a system associated with a response asset to pick up orders from multiple nearby restaurants if the orders are scheduled to be available at or near the same time. On the other hand, if one or more orders are set to be available substantially earlier or later than the other grouped orders, the ability to efficiently pick up all the orders and deliver them in a timely manner that otherwise satisfies the requirements associated with each grouped request object may be compromised. Any of a number of approaches to determining when an order is likely to be available, including but not limited to the approaches to ascertaining "make time" and similar timing parameters discussed elsewhere herein may be used in implementations of block 516. If the particular response asset is determined to be in a condition such that the assigning the unassigned request data object to the response asset would put the group associated with the response asset at or over the grouping timing limit set for the particular response asset, process portion 500 proceeds from block 516 to block 524, where it is determined if there are any other response assets to evaluate for potential assignment.

In situations where it is determined that assigning a particular request object to a response asset would not violate the group timing limit of the response asset, process portion 500 proceeds to block 518, which includes determining a grouping delay status associated with the request data object. In some implementations of process 300, some intermediate locations (i.e., restaurants and/or other locations where goods, materials and/or other resources must be acquired to fulfill the requirements associated with the request data object) can be designated as fast or slow. In such implementations, intermediate locations that are designated as "fast" are generally incompatible with grouping, based at least in part, for example, on the timing constraints and other factors associated with such intermediate locations and the requests involving those locations. In such implementations, in order to permit grouping of multiple request data objects with a single response asset, the request data object must but such (and the request data objects already associated with a particular response asset) that the intermediate location is designated as slow. If the particular request object and/or response asset is determined to be in a condition such that the assigning the unassigned request data object to the response asset would cause a group associated with the response asset to violate the grouping delay status set for the particular response asset, process portion 500 proceeds from block 516 to block 524, where it is determined if there are any other response assets to evaluate for potential assignment.

In situations where it is determined that assigning a particular request object to a response asset would not violate the grouping delay status set of the particular response asset, process portion 500 proceeds to block 520, which includes determining a grouping authorization status. In some example implementations of process portion 500 in general and block 520 in particular, an intermediate location (such as a restaurant in the context of food delivery systems) may not permit request data objects that involve that particular intermediate location to be grouped with any other request data objects. Consequently, in implementations of block 520, regardless of whether a request data object would be otherwise suitable for grouping, and regardless of whether a particular response asset would be otherwise capable of accommodating the request object as part of a grouped set of request objects, a determination that grouping is not authorized for a particular request data object causes process portion 500 to proceed to block 524, where it is determined if there are any other response assets to evaluate for potential assignment.

In situations where it is determined that a particular request object may be grouped with others, process portion 500 proceeds to block 522, which includes dispatching the response asset. In implementations of block 522, having ascertained that the request object and the response asset may be grouped, the request data object is assigned to the response asset, and portion of the request data object is transmitted to the network response asset and systems associated therewith. In some example implementations, the portion of the request data object includes an identification of an intermediate destination, instructions associated with the intermediate destination, an identification of a target destination, and/or any additional information that may be necessary to satisfy the requirements of the request data object.

As shown in FIG. 5, process portion 500 also includes block 524, which causes process portion 500 to iteratively evaluate potential response assets for pairing with a request object until either a response asset is identified or the list of potential response assets is exhausted. In situations where the list of potential response assets is exhausted, process portion 500 proceeds to block 622, which is depicted as part of process portion 600 in FIG. 6.

FIG. 6 depicts a process portion 500 associated with Submode 2 discussed in connection with block 408 of FIG. 4. As shown in FIG. 6, process portion 600 commences at block 602 when process portion 400 transitions from block 408 (or block 724, as discussed herein with respect to FIG. 7). As discussed in connection with Submode 2 and block 408, block 602 indicates that process portion 600 is configured to attempt to pair incoming, unassigned request data objects with response assets that are not assigned a request object and/or are otherwise idle. In the context of dispatching drivers to physically pick up and deliver goods and services, such as food orders, implementations of process portion 600 tend to result in situations where drivers deliver one order at a time, and do not tend to group orders that share nearby intermediate and/or target destinations.

As depicted by block 604, process portion 600 includes fetching all available response assets. In implementations of block 604 that arise in system environments similar to system environment 100, the object-asset pairing system 100 may fetch the relevant response assets by having pairing system module 102A and/or pairing system server 102B query the pairing system database 102C or another data repository and processing the returned query results to identify the desired data. In implementations involving physical deliveries, upon receiving an unpaired/undispatched request, block 604 involves fetching all potential delivery systems for further processing to ascertain how a received request data object should be paired.

Once the available response assets have been identified, process portion 600 proceeds to block 606, which is the starting point of a set of qualification criteria against which all of the identified response assets are compared. It will be appreciated that while FIG. 6 and process portion 600 depict a series of criteria (shown at blocks 606-616), alterations to the criteria may be made (including but not limited to the addition, subtraction and/or modification of the criteria) without departing from the spirit and scope of embodiments of the invention. Moreover, and regardless of precise criteria applied and/or the mechanism used to establish the criteria, example implementations of blocks 606-616 may accomplish the evaluation of each response asset through the interaction of system components, such as the apparatus 200, and/or other components, such as object-asset pairing system 102, and/or querying a database that houses the relevant information, such as pairing system database 102C. In other example implementations, information used to evaluate a particular response asset may be obtained by seeking and/or receiving an indication associated with the response asset's characteristics by establishing communication with a user device and/or application module associated with the response asset, such as, for example, the response asset module 106A and the response asset device 106B which are shown in FIG. 1 as part of a response asset system 106.

In general, blocks 606-616 involve applying a series of criteria to conditionally exclude and/or disqualify potential response assets from being paired with a request data object, ranking the qualified response assets, and selecting a response asset to be paired with the particular request data object. As shown at block 606, process portion 600 includes excluding response assets based on distance and activity. As noted above, implementations of process portion 600 are advantageous in situations where it is deemed preferable to ensure that all possible response assets are active at any given time. Consequently, in implementations of block 606, response assets that have already been paired with a request data object and have not completed the satisfaction of that request data object are excluded. Some example implementations of block 606 contemplate response assets that are near-idle, in the sense that they have nearly completed addressing their currently-paired request data object, and are anticipated to be in an idle condition within a relatively short period of time. For example, in the context of the delivery of food or other goods and/or materials, a response asset whose associated system may be at or near a target destination (such as a customer drop-off location) may be deemed near-idle, and not excluded in a particular implementation of block 606.

Once certain of the response assets have been excluded at block 606, process portion 600 proceeds to block 608, which includes conditionally excluding non-idle response assets. As noted above with respect to block 606, some implementations of process portion 600 contemplate a near-idle status of occupied response assets that are anticipated to return to an idle state within a relatively short period of time. At block 608, process portion 600 determines whether the particular service in which process 600 is implemented supports the pairing of incoming request data objects with response assets that are in a near-idle status. In situations where such pairing is not supported, near-idle response assets are excluded, and process portion 600 proceeds to block 610.

As shown in block 610, process portion 600 includes excluding response assets that are unauthorized at a specific location. In some situations, a response asset and/or a system associated therewith may not be authorized to interact with systems and/or enter locations that are associated with a particular request object. For example, in the context of the delivery of good and/or other materials, an intermediate location associated with the request object, (such as a restaurant or other location at which goods and/or other materials must be acquired in order to satisfy the requirements of the request object) may have rules that bar individuals or entities associated with particular response assets from entering the premises. In another example, controlled-access buildings and/or other facilities may require advanced authorization of response assets and systems associated therewith, such that response assets that are not authorized will be unable to cause the full satisfaction of the requirements of the request object.

As shown in block 612, process portion 600 includes excluding response assets based on a utilization time limit. In some example implementations, response assets and/or systems associated therewith have limits (such as daily and/or weekly maxima) on the time during which they can be used. As such, implementations of block 612 involve determining whether pairing a request object with a particular response asset would cause that response asset to violate a time limit associated with that response asset during the course of satisfying the requirements associated with the request object.

As shown in block 614, process portion 600 includes ranking the remaining response assets. Any of a number of criteria may be used to rank the remaining response assets, including but not limited to how many times a response asset has been dispatched over the course of a particular time period, a predetermined schedule, past performance data associated with the response asset; the location of a system associated with the response asset with respect to locations associated with the request object, an estimate of the time it would likely take for a particular response asset to meet the requirements of the request object, and the like.

After applying the ranking criteria to the response assets, process portion 600 proceeds to block 616, which includes determining whether any response assets remain, such that the request object may be paired with a response asset. In situations where there are remaining response assets, process portion 600 proceeds to block 624, where the request object is paired with the highest-ranked response asset. In situations where there is not an available response asset, process portion 600 proceeds to block 618

As shown in block 618, process portion 600 contemplates multiple submodes that may involve the application of different criteria when attempting to pair request objects with response assets. In the example depicted by process portion 600, if the submode associated with the particular request object is Submode 2, as discussed herein, process portion 600 proceeds to block 502, where the request object may be further processed and potentially grouped with a response asset. If the submode associated with the request object is not Submode 2, process portion 600 transitions to block 620, wherein the request object is not dispatched, as there is no suitable response asset capable of handling the request object.

FIG. 6 also depicts block 622. As noted herein with respect to process portion 500 generally and block 524 in particular, process 300 proceeds from block 524 to block 622 in situations where a request object was unable to be grouped in the course of process portion 500. Block 622 includes determining whether the submode associated with the particular request object is Submode 1, as discussed in connection with FIGS. 4 and 5. In situations where the submode associated with the request object is Submode 1, process portion 600 proceeds from block 622 to block 602, for attempted pairing with an idle or near-idle response asset. In instances where the submode associated with the incoming request object at block 622 is not Submode 1, process portion 600 proceeds to block 620, wherein the request object is not dispatched, as there is no suitable response asset capable of handling the request object.

FIG. 7 depicts a process portion 700 associated with Submode 3 discussed in connection with block 406 of FIG. 4. As shown in FIG. 7, process portion 700 commences at block 702 when process 300 transitions from block 406. As discussed in connection with Submode 3 and block 406, block 702 indicates that process portion 700 is configured to attempt to group request objects that involve intermediate locations that are identical each other. In the context of dispatching drivers to physically pick up and deliver goods and services, such as food orders, implementations of process portion 700 seek to assign multiple orders to a single driver such that the driver is able to stop at a particular restaurant, pick up all of the various items that are scheduled to be ready within a particular time window, and then proceed to the respective delivery locations and effectuate on-time deliveries.

As depicted by block 704, process portion 700 includes fetching all previously assigned request data objects that meet a particular response state condition, and identifying the response asset associated with each such object. In implementations of block 704 that arise in system environments similar to system environment 100, the object-asset pairing system 100 may fetch the relevant request data objects by having pairing system module 102A and/or pairing system server 102B query the pairing system database 102C or another data repository and processing the returned query results to identify the desired data. In implementations involving physical deliveries, upon receiving an unpaired/undispatched request, block 704 involves fetching all other deliveries which have been dispatched and/or otherwise assigned to a particular driver, but for which the driver has not yet picked up the order. As such, block 704 contemplates detecting a delivery state in which a driver may be en route to a particular restaurant or other location, but, because the driver has not yet picked up the food or other goods, the driver may be able to be efficiently notified to pick up another delivery at the same restaurant and maintain the ability to successfully perform all of the necessary steps associated with each of the multiple deliveries.

Once the potentially relevant request data objects are acquired and the potential response assets identified, process portion 700 proceeds to block 706, which is the starting point of a set of qualification criteria against which all of the identified response assets are compared. It will be appreciated that while FIG. 7 and process portion 700 depict a series of criteria (shown at blocks 708-720), alterations to the criteria may be made (including but not limited to the addition, subtraction and/or modification of the criteria) without departing from the spirit and scope of embodiments of the invention. Moreover, and regardless of precise criteria applied and/or the mechanism used to establish the criteria, example implementations of blocks 708-720 may accomplish the evaluation of each response asset through the interaction of system components, such as the apparatus 200, and/or other components, such as object-asset pairing system 102, and/or querying a database that houses the relevant information, such as pairing system database 102C. In other example implementations, information used to evaluate a particular response asset may be obtained by seeking and/or receiving an indication associated with the response asset's characteristics by establishing communication with a user device and/or application module associated with the response asset, such as, for example, the response asset module 106A and the response asset device 106B which are shown in FIG. 1 as part of a response asset system 106.

It will be appreciated that the blocks 708, 710, and 714-722 are similar to blocks 508, 510, and 514-522, such that the discussions of those blocks are applicable to their respective counterparts, and that any implementation of block 508, 510, and 514-522 may be used in implementations of their respective counterparts in process portion 700.

Block 712, which includes determining an intermediate location parameter associated with a request object and a response asset, is similar to block 512 in FIG. 5, but differs in the sense that instead of setting a grouping range limit on the intermediate locations which may be suitably close to each other to facilitate grouping, process portion 700 in general, and block 712 in particular, require that the intermediate location associated with a request object that is currently assigned to a response asset under evaluation and the intermediate location associated with an unpaired request object be identical.

Block 724, also slightly differs from its counterpart at block 524 in FIG. 5 in the sense that, upon determining that the list of potential response assets to be evaluated in process portion 700 is exhausted, process portion 700 proceeds to block 602, where the request object may be paired with an idle response asset.

FIG. 8 depicts a process portion 800 associated with limited capacity or "busy" mode referenced and discussed in connection with block 314 and other portions of FIG. 3. As shown in FIG. 8, process portion 800 commences at block 801 when process 300 transitions from block 314. In general, process portion 800 is aimed at addressing system overload and near-overload conditions by attempting to pair request data objects with the network response asset that is most likely to address and satisfy the requirements of the request in the minimum time. In the context of dispatching drivers or other systems to physically pick up and deliver goods and services, such as food orders, implementations of process portion 800 seek rapidly identify eligible response assets, calculate the time it is likely to take systems associated with the eligible response assets to respond to the request, and select the response asset that is most likely to be able to effectuate the fulfillment of the request in the minimum of time.

As depicted by block 801, process portion 800 includes fetching all unassigned request data objects and all available response assets. In implementations of block 801 that arise in system environments similar to system environment 100, the object-asset pairing system 100 may fetch the relevant request data objects by having pairing system module 102A and/or pairing system server 102B query the pairing system database 102C or another data repository and processing the returned query results to identify the desired data. In implementations involving physical deliveries, upon receiving an unpaired/undispatched request, block 801 also involves fetching all available response assets for evaluation and potential pairing.

As depicted by block 802, process portion 800 includes, for each unpaired request object and each available response asset, calculating a response time for intermediate destination. In implementations of block 802 that arise in the context of physically acquiring and delivering resources, goods, and/or other materials, the system calculates, such as through the use of the beacon-based approach described herein, for example, the estimated time necessary for a system associated with a response asset to move from its current location to the intermediate destination, where the required resources, goods, and/or other are to be acquired and moved to the target destination.

Upon completion of the response time calculation in block 802, process portion 800 proceeds to block 804, where it commences, for each unpaired request object, a series of steps 806-832, in an effort to assign the unpaired request object to a response asset. It will be appreciated that while FIG. 8 and process portion 800 depict a series of criteria (shown at blocks 806-832), alterations to the criteria may be made (including but not limited to the addition, subtraction and/or modification of the criteria) without departing from the spirit and scope of embodiments of the invention. Moreover, and regardless of precise criteria applied and/or the mechanism used to establish the criteria, example implementations of blocks 806-832 may accomplish the evaluation of each response asset through the interaction of system components, such as the apparatus 200, and/or other components, such as object-asset pairing system 102, and/or querying a database that houses the relevant information, such as pairing system database 102C. In other example implementations, information used to evaluate a particular response asset may be obtained by seeking and/or receiving an indication associated with the response asset's characteristics by establishing communication with a user device and/or application module associated with the response asset, such as, for example, the response asset module 106A and the response asset device 106B which are shown in FIG. 1 as part of a response asset system 106.

As shown at block 806, process portion 800 includes fetching a list of eligible response assets. An example approach to stepping through an example set of criteria is shown in FIG. 8 at blocks 808-824, which are described in more detail below. After the list of eligible response assets is fetched at block 806, process portion 800 transitions to block 826, which includes verifying whether any response assets exist. In some situations, the list of eligible response assets may include a number of response assets that may be paired with a request object. However, depending the characteristics of the request object and the available response assets, as well as the general state of the system environment, it is possible that there may not be any available response assets at a given time for a given request object.

As shown at block 828, in situations where there are eligible response assets, the response asset associated with the shortest response time is selected, and process portion 800 subsequently transitions to block 830, where the request object is paired with the response asset and the response asset is dispatched to address the request object. As shown at block 832, in situations where there are no eligible response assets, process portion 800 contemplates switch to a "normal" operation mode, and proceeding to block 402 to further process the request object and attempt to pair the request object with a response asset.

As shown in FIG. 8, block 808-824 present an example approach to stepping through an example set of criteria. It will be appreciated that many of the criteria set out in blocks 808-824 are similar to criteria and other aspects discussed in connection with FIGS. 3-7. Consequently, it will be appreciated that any of the criteria disclosed or otherwise contemplated in connection with the process portions set out in FIGS. 3-7, and any approaches to implementing such criteria, may be used in example implementations of process portion 800 in general and blocks 808-824 in particular.

As shown at block 808, each available response asset is evaluated to develop a list of eligible response assets that may be used in connection with blocks 826-832 of process portion 800. As shown at block 810, process portion 800 includes determining a resource acquisition status of a response asset. Some implementations of block 810 consider that response assets that are already engaged in satisfying a request object to the point that all materials necessary to satisfy the request have been acquired are ineligible to be paired with other request objects until completing the tasks associated with its current request object. For example, if a system associated with a response asset that has been paired with a request object that seeks a food delivery, implementations of block 810 may include determining whether the response asset system has already acquired the requested items from the intermediate destination and/or is en route to the target destination. If so, as shown in FIG. 8, process portion 800 proceeds to block 822, where the response asset is indicated as being ineligible.

As shown in block 812, each response asset is also evaluated to determine whether any particular response asset is disqualified from and/or otherwise unauthorized to proceed to the intermediate destination associated with the unpaired request object. As such, block 812 is similar to block 610, and any approach to implementing block 610 may be used in implementations of block 812. As shown in FIG. 8, a disqualified response asset is indicated to be ineligible at block 822.

As shown in block 814, process portion 800 includes determining an asset dispatch status. In some example implementations of block 814, a response asset is evaluated to ascertain whether the response asset and/or a system associated with the response asset is idle and/or near idle. In some example implementations, the response asset is also evaluated to determine whether it is currently paired with a request object that shares an intermediate destination with the unpaired request object. As shown in block 814, if the response asset is not idle and/or is not already paired with a request object that shares an intermediate destination with the unpaired request object, the response asset is deemed ineligible.

As shown in blocks 816, 818, and 820, each remaining response asset is evaluated to determine the grouping limit status of the response asset, a distance threshold status for the response asset, and a time threshold status for the response asset. Each of these blocks 816, 818, and 820 correspond to one or more of blocks 510, 512, 514, 516, and their respective counterparts in process portion 700, and are used to determine whether a request object can be grouped with any request objects that have previously been paired to the response asset without violating the limits imposed on the response asset.

As shown in FIG. 8, response assets that successfully meet all of the applied criteria are deemed eligible to be paired with the unpaired request object, and are added to a list of eligible response assets for processing in accordance with blocks 826-832.

FIG. 9 is a block diagram illustrating a set of operations 900 performed, such as by the apparatus of FIG. 2, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 9 and depicted therein.

As shown at block 902, the apparatus 200 is capable of receiving a request data object. Any of the request data objects discussed or otherwise contemplated herein may be used in connection with implementations of the apparatus 200 and block 902. As discussed herein, many advantageous implementations of the apparatus 200 and other embodiments of the invention described herein arise in the context of request data objects that seek to cause the movement of goods, materials, and/or other resources from one physical location to another. As such, in some implementations, the request data object may take the form of a data object that conforms to a particular structure and/or format that is designed to be passed to a specific system for processing and pairing such request data objects with network response assets and the systems associated therewith. Regardless of the precise format of the request data object, the request data object contains at least a request from a user or other entity, and an indication of the requirements and/or other parameters associated with the request.

As shown at block 904, the apparatus 200 is also capable of extracting from the request data object a set of request parameters. Upon receipt of the request data object, the apparatus may parse and/or otherwise process the request data object to obtain the request parameters contained within the request data object. In some implementations, the set of request parameters includes a first location identification, wherein the first location identification is associated with a requested intermediate destination. As discussed herein, an intermediate location may include, for example a location at which resources, such as good and/or other materials, must be obtained in order to fulfill the requirements of the request data object. Any approach to identifying a location may be used, including but not limited to, providing GPS and/or other coordinate, address information, and/or other indications of a specific location.

In some example implementations of block 904, the set of request parameters also includes a set of request instructions associated with the requested intermediate destination. For example, the request instructions may include a list of resources, goods, and/or other materials to be acquired at the intermediate location, and/or other instructions regarding the acquisition thereof.

In some example implementations, the set of request parameters also includes a second location identification, wherein the second location identification is associated with a requested target destination. As discussed herein, a requested target destination may be location at which resources associated with a request, such as goods and/or other materials, are to be delivered. In some example implementations, the target location may be a location associated with the individual or entity responsible for creating the request data object and/or causing the request data object to be created.

In some example implementations, the set of request parameters further comprise a time constraint associated with the request data object. In some example implementations, a request data object may be time sensitive, in the sense that fulfillment of the requirements of a request must occur within a particular time limit. For example, in situations that involve the movement of resources, such as sensitive or needed materials, and/or perishable items, delay in fulfillment of request data object requirements may be associated with failure conditions or other negative consequences. By extracting a time constraint from a request data object, the apparatus 200 is capable of taking into account the time constraint (and any other parameter discussed or contemplated herein) when attempting to pair the request data object with a network response asset.

As shown in block 906, the apparatus is capable of identifying a set of response assets. As discussed throughout this disclosure, any of a number of approaches to identifying a set of network response assets, including but not limited to querying a database that contains identifications of network response assets, such as pairing system database 102C, establishing communication with systems and/or mobile devices associated with network response assets, such as response asset system 106 and response asset device 106B, or any other approach sufficient to fetch, determine, and/or identify a set of network response assets.

As shown in block 908, the apparatus is also capable of, for each network response asset, determining a set of network response asset characteristics. In some example implementations, the set of network response asset characteristics comprises a third location identification, wherein the third location identification comprises a triangulation location of a mobile device associated with the network response asset. It will be appreciated that a triangulation location may be any physical location that is ascertained through the use of a triangulation protocol, such as GPS, cellular-based location services, or the like. In many implementations of block 908, the triangulation location may be that of a mobile device, such as response asset device 106B, which is capable of ascertaining its location and passing that location to the apparatus. In some example implementations, it is particularly advantageous for the triangulation location of the mobile device associated with the network response asset to be an indication of a real-time or a near real-time geographic position of mobile device. In some such example implementations, the mobile device may be used to track the location of a system associated with a network response asset as the system moves to fulfill the requirements of a request data object. In some example implementations, the set of network response asset characteristics further comprises a response state of the network response asset and/or an authorization status of the network response asset. For example, a response state may indicate whether a network response asset is idle, paired with one or request data objects, and/or the status of the fulfillment of the requirements of one or more request data objects. In implementations that involve an authorization status, the authorization status may, for example, provide an indication regarding whether a particular network response asset is authorized to be paired with a particular request data object, and/or otherwise authorized to interact with systems and/or other entities associated with one or more intermediate destinations and/or target destinations. Moreover, it will be appreciated that any of the characteristics of a network response asset described or otherwise contemplated herein, particularly with reference to those presented in connection with FIGS. 3-8, may be included in the set of response asset characteristics.

As shown in block 910, the apparatus is also capable of selecting a network response asset based at least in part on the set of request parameters and at least one network response asset characteristic. Any of the approaches described or contemplated herein for selecting and/or pairing a network response asset, including but not limited to those presented in connection with FIGS. 3-8, may be used in example implementations of block 910. For example, selecting a network response asset comprises determining an ordered list of network response assets and select the highest ordered network response asset.

As shown in block 912, the apparatus is also capable of transmitting to the network response asset a portion of the request data object. In some implementations, the portion of the request data object includes the request parameters, such as the intermediate destination, any instructions associated therewith, and/or the target destination. However it will be appreciated that any information associated with a request data object may be transmitted to the network response asset in connection with implementations of block 912. Moreover, in some example implementations, transmitting a portion of the request data comprises causing a communication channel to be opened with the mobile device associated with the network response asset; and causing an indication of the request data to be displayed on a user interface of the mobile device.

As described above, FIGS. 3, 4, 5, 6, 7, 8 and 9 illustrate flowcharts of an apparatus, such as apparatus 200, a method, and a computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising a processor and a memory, the memory comprising instructions that configure the apparatus to:

identify a set of network response assets;

determine a capacity of the set of network response assets based at least in part on an availability of each network response asset in the set of network response assets;

determine a dispatch mode based at least in part on the capacity of the set of network response assets;

receive a request data object;

extract from the request data object a set of request parameters, wherein the set of request parameters comprises:

a first location identification, wherein the first location identification is associated with a requested intermediate destination; and a second location identification, wherein the second location identification is associated with a requested target destination;

for each network response asset of the set of network response assets, determine a set of network response asset characteristics, wherein the set of network response asset characteristics comprises a third location identification, wherein the third location identification comprises a location of a mobile device associated with the network response asset;

select a network response asset based at least in part on the dispatch mode, the set of request parameters, and at least one of the set of network response asset characteristics; and transmit to the selected network response asset a portion of the request data object.

2. The apparatus of claim 1, wherein selecting the network response asset further comprises configuring the apparatus to at least determine an ordered list of network response assets and selecting the highest ordered network response asset.

3. The apparatus of claim 1, wherein the transmitting to the selected network response asset the portion of the request data object comprises configuring the apparatus to at least:
cause a communication channel to be opened between the apparatus and the mobile device associated with the selected network response asset; and
cause an indication of the request data object to be displayed on a user interface of the mobile device.

4. The apparatus of claim 1, wherein the set of request parameters further comprises a time constraint associated with the request data object.

5. The apparatus of claim 1, wherein the location of the mobile device comprises an indication of a real-time or a near real-time geographic position of the mobile device.

6. The apparatus of claim 1, wherein the memory comprising instructions that configure the apparatus are further configured to:
determine, after extracting from the request data object a set of request parameters, a timing parameter associated with the request data object, including at least a make time; and
wherein selecting the network response asset is further based on the timing parameter.

7. The apparatus of claim 1, wherein the set of network response asset characteristics further comprises an authorization status of the network response asset.

8. A computer program product comprising at least one non-transitory computer-readable storage medium having computer-executable program code instruction stored therein, the computer-executable program code instructions comprising program code instructions configured to:
identify a set of network response assets;
determine a capacity of the set of network response assets based at least in part on an availability of each network response asset in the set of network response assets;
determine a dispatch mode based at least in part on the capacity of the set of network response assets;
receive a request data object;
extract from the request data object a set of request parameters, wherein the set of request parameters comprises:
a first location identification, wherein the first location identification is associated with a requested intermediate destination; and
a second location identification, wherein the second location identification is associated with a requested target destination;
for each network response asset of the set of network response assets, determine a set of network response asset characteristics, wherein the set of network response asset characteristics comprises a third location identification, wherein the third location identification comprises a location of a mobile device associated with the network response asset;
select a network response asset based at least in part on the dispatch mode, the set of request parameters, and at least one of the set of network response asset characteristics; and
transmit to the selected network response asset a portion of the request data object.

9. The computer program product of claim 8, wherein the selecting the network response asset comprises determining an ordered list of network response assets and selecting the highest ordered network response asset.

10. The computer program product of claim 8, wherein transmitting to the selected network response asset the portion of the request data object comprises:
causing a communication channel to be opened with the mobile device associated with the network response asset; and
causing an indication of the request data object to be displayed on a user interface of the mobile device.

11. The computer program product of claim 8, wherein the set of request parameters further comprise a time constraint associated with the request data object.

12. The computer program product of claim 8, wherein the location of the mobile device associated with the network response asset comprises an indication of a real-time or a near real-time geographic position of the mobile device.

13. The computer program product of claim 8, wherein the computer-executable program code instructions comprising program code instructions are further configured to:
determine, after extracting from the request data object a set of request parameters, a timing parameter associated with the request data object, including at least a make time; and
wherein selecting the network response asset is further based on the timing parameter.

14. The computer program product of claim 8, wherein the set of network response asset characteristics further comprises an authorization status of the network response asset.

15. A method for object-response asset authorization and pairing, the method comprising:
identifying a set of network response assets;
determining a capacity of the set of network response assets based at least in part on an availability of each network response asset in the set of network response assets;
determining a dispatch mode based at least in part on the capacity of the set of network response assets;
receiving a request data object;
extracting from the request data object a set of request parameters, wherein the set of request parameters comprises:
a first location identification, wherein the first location identification is associated with a requested intermediate destination;
a second location identification, wherein the second location identification is associated with a requested target destination;
for each network response asset of the set of network response assets, determining a set of network response asset characteristics, wherein the set of network response asset characteristics comprises a third location identification, wherein the third location identification comprises a location of a mobile device associated with the network response asset;
selecting a network response asset based at least in part on the dispatch mode, the set of request parameters, and at least one of the set of network response asset characteristics; and
transmitting to the selected network response asset a portion of the request data object.

16. The method of claim 15, wherein selecting the network response asset comprises determining an ordered list of network response assets and selecting the highest ordered network response asset.

17. The method of claim 15, wherein transmitting to the network response asset the portion of the request data object comprises:
   causing a communication channel to be opened with the mobile device associated with the network response asset; and
   causing an indication of the request data object to be displayed on a user interface of the mobile device.

18. The method of claim 15, wherein the set of request parameters further comprise a time constraint associated with the request data object.

19. The method of claim 15, wherein the location of the mobile device associated with the network response asset comprises an indication of a real-time or a near real-time geographic position of the mobile device.

20. The method of claim 15 further comprising:
   determining, after extracting from the request data object a set of request parameters, a timing parameter associated with the request data object, including at least a make time; and wherein selecting the network response asset is further based on the timing parameter.

* * * * *